United States Patent [19]

Blount

[11] Patent Number: 4,945,074

[45] Date of Patent: Jul. 31, 1990

[54] POLYMERIC ALKALI METAL SILICATE GLASS

[76] Inventor: David H. Blount, 6728 Del Cerro Blvd., San Diego, Calif. 92120

[21] Appl. No.: 345,841

[22] Filed: May 1, 1989

Related U.S. Application Data

[63] Continuation of Ser. No. 339,667, Apr. 18, 1989, Pat. No. 4,908,339, which is a continuation-in-part of Ser. No. 057,810, Jun. 1, 1987, Pat. No. 4,824,807.

[51] Int. Cl.$^5$ .................................................. C03C 3/04
[52] U.S. Cl. .................................. 501/53; 23/313 AS; 65/18.1; 65/18.3; 65/18.4; 65/900; 106/813; 106/600
[58] Field of Search ............... 106/74, 84; 65/18.1, 65/18.3, 18.4, 30.1, 111, 900, 901; 428/149, 404, 426, 446; 423/332, 333, 334; 23/313 AS; 501/53

[56] References Cited

U.S. PATENT DOCUMENTS

| | | | |
|---|---|---|---|
| 3,948,629 | 4/1976 | Bartholemew et al. | 106/74 X |
| 4,059,425 | 11/1977 | Brydges et al. | 65/30.12 X |
| 4,125,651 | 11/1978 | Campbell et al. | 106/74 X |
| 4,142,878 | 3/1979 | Olszewski et al. | 65/30.12 X |
| 4,366,136 | 12/1982 | Kartschmaroff et al. | 106/74 X |

Primary Examiner—Robert L. Lindsay

[57] ABSTRACT

The present invention relates to producing a polymeric alkali metal silicate glass powder by repeated steps of partial hydration and dehydration until the desired degree of polymerization has taken place. The polymeric alkali metal silicate glass may be utilized to produce aqueous polymeric alkali metal silicate glass solutions containing a suspension. This solution containing a suspension may be used as an adhesive, a binding agent, a laminating agent, coating agent and molding material.

17 Claims, No Drawings

POLYMERIC ALKALI METAL SILICATE GLASS

This a continuation of a pending application No. 339,667, filed 4/18/89, now U.S. Pat. No. 4,908,339, granted 3/13/1990 titled "PROCESS FOR THE PRODUCTION OF FLEXIBLE GLASS" which is a continuation-in-part of application no. 057,810, filed 06/01/87, now U.S. Pat. No. 4,824,807.

BACKGROUND OF THE INVENTION

This invention relates to a process for the production of polymeric alkali metaol silicate glass. This product has good strength, elasticity, wear resistance and will not support a flame. It may be utilized as a coating agent as adhesive, as binders, as a laminating agent, for molding useful products and for film producing.

In U.S. Pat. Application, no. 057810, filed 06-01-87, a flexible glass was produced whereas in this invention a much stronger polymeric alkali metal silicate glass is produced by polymerizing the alkali metal silicate by using multiple steps of controlled hydration and dehydration. The production of alkali metal silicate film is known in the Arts. The films produced from the known aqueous alkali metal silicate solution are brittle, had poor strength and develops micro-cracks while drying. On pages 122 and 123 of "The Chemistry of Silica" by Ralph K. Iler, published in 1979 by A. Willy-Interscience Publication, New York, Iler discusses sodium silicate solutions used as adhesives and points out that the film formed by drying the water from the sodium silicate produces a film which is brittle and has microcracks that lower the strength of th dried film.

I have discovered that a strong, somewhat elastic polymeric alkali metal glass product which may be rigid or flexible, can be produced by multiple steps of controlled limited hydration and dehydration of a powdered alkali metal silicate glass with a silicon dioxide:alkali metal oxide ratio of 1:1 to 3.9:1, preferably a ratio of 2.0:1 to 3.3. The polymeric alkali metal glass is then mixed with water until a suspension and/or a solution is produced. The excess water is then evaporated from the aqueous suspension or solution thereby producing a polymeric alkali metal silicate glass product. The silicon dioxide:alkali metal oxide ratio of the aqueous polymeric alkali metal silicate glass suspension and/or solution may be increased up to about 25:1 by the addition of oxidated silicon compounds such as hydrated silica, aqueous suspended silica, precipitated silica, fumed silica, silicic acid, polysilicic acid, etc. The amount of oxidated silicon compounds used is limited by the amount of water present.

SUMMARY OF THE INVENTION

The alkali metal silicate glass utilized in this invention may be produced by any of the known methods such as fusing silica with alkali metal hydroxides and/or alkali metal sulfates in the presence of carbon. The fused alkali metal silicate glass is preferred to be in the form of a fine powder which will pass through a 65 mesh-screen.

The alkali metal silicate glass may be polymerized by repeated steps of limited hydration and dehydration by evaporation under any suitable physical condition. Suitable physical conditions range from exposiing the glass powder to air which contains varying amounts of humidity and at varying temperature over a period of several months. The rate of polymerization will vary with the silicon dioxide alkali metal oxide ratio, with the amount of water present in the air, with the temperature, with the rate of evaporation of the water from the glass powder and with the pressure. The alkali metal silicate powder with a high ratio or high moles % of alkali metal oxide may be hydrated more rapidly than alkali metal silicate glass with a low ratio of alkali metal oxide.

I have discovered that polymerization of the alkali metal silicate glass powder may take place by exposing the glass powder to the air at ambient temperature and pressure over a period of several months. Under normal climatic condition the humidity in the air will vary from a low percentage to 100 percent. When the humidity is high, glass powder absorbs water and the glass powder is partially hydrolyzed then when the humidity became low in the air, the water is evaporated from the glass powder and limited polymerization takes place. This slow limited polymerization allows the alkali metal silicate glass molecules to react together to form larger molecules which appear to be of a linear type. This controlled particle hydration and dehydration of the glass powder may be speeded up in producing polymeric alkali metal silicate glass bey controlling the humidity of the air, the length of time that the glass is exposed to the humidity, the pressure and the temperature of the humidified air and by controlling the evaporation cycle as to length of time that the glass is exposed to the dry air, the pressure, the air flow rate and the temperature of the dry air.

The partial hydration step may take place by exposing the glass powder to air saturated with stream under pressure for a short period of time then evaporating the water with a stream of hot air. These steps may be repeated as many times as necessary to produce the desired amount of polymerization.

The preferred method to produce polymeric alkali metal silicate glass is to expose the powdered alkali metal silicate glass to normal atmospheric air containing various percentages of humidity and at ambient temperature and pressure for a period of 1 to 12 months. The polymeric alkali metal silicate glass powder is then placed in water to produce an aqueous polymeric alkali metal silicate suspension and/or solution. This suspension and/or solution is then poured or applied into the desired form and the excess water is evaporated off thereby producing a polymeric alkali metal silicate glass product.

Another method to produce polymeric alkali metal silicate glass is to expose the powdered glass to air with controlled high humidity at ambient or elevated temperature and ambient pressure for several hours then evaporate the absorbed water with a hot air flowing through the agitated powder. These steps are repeated many times for a period of 2 weeks to 12 months depending on the alkali metal oxide content of the glass, until the desired amount of polymerization has taken place.

Polymeric alkali metal glass powder may also be produced by another method wherein the glass powder is contacted with air containing steam and under pressure for 1 minute to 15 minutes then the absorbed water is removed by evaporating the water with a stream of hot air flowing through the glass powder while being agitated. These steps are repeated many times for a period of 1 to 60 days until the desired amount of polymerization has taken place. The gaseous water should have a relative humidity of at least 5% at a temperature greater than 100° C. for sufficient time and at a steam pressure sufficient to hydrate no more than 4 silicon oxide radicals on the alkali metal silicate molecule.

The exact course of the reactions which take place during the process to produce polymeric alkali metal silicate glass products cannot be determined with 100 percent certainty. The chemical formula for the polymeric alkali metal silicate glass may vary greatly. The exact part that the oxygen plays in the production of the polymeric glass is not completely known. The production of the polymeric glass is illustrated below:

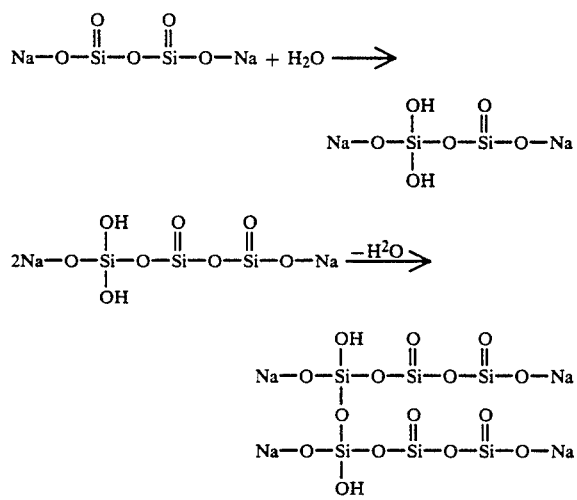

These molecules are further reacted together through oxygen linkages by further limited hydration and by the loss of water to form compounds with a large molecular weight. Oxygen of the air probably also assists in forming oxygen linkages between the alkali metal silicate molecules. It is necessary to have limited hydration of the glass molecules in order to react the glass molecules together to produce larger polymeric alkali metal silicate molecules. When the polymeric alkali metal silicate is dissolved in water to produce a suspension and/or a solution and is then dried there is further cross-linking of the molecules to produce a strong, somewhat elastic, flexible or rigid polymeric alkali metal silicate glass product.

The polymeric alkali metal silicates have the general formula of:

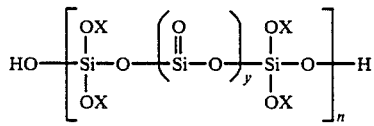

wherein X is an alkali metal atom or a hydrogen atom or a cross-linkage to another polymeric alkali metal silicate glass molecule, y is a number ranging from 1-10 and n is a number 2 or greater; wherein the $SiO_2:MeO$ ratio ranges from 2:0 to 3.0:1 (Me=alkali metal). The polymeric glass may be further cross-linked in the curing process.

Any suitable alkali metal silicate glass may be used in this invention. Suitable alkali metal silicate include sodium silicate, potassium silicate, lithium silicate and mixtures thereof. Sodium silicate glass is the preferred alkali metal silicate glass. The silicon dioxide:alkali metal oxide ratio ($SiO_2:Na_2O$ ratio) ranges from 1:1 to 3.9:1 by weight. The alkali metal silicate glass is preferred to be in a powdered form that will pass through a 65 mesh screen. The alkali metal silicate should have a silicon dioxide:alkali metal oxide ratio where an aqueous alkali metal silicate solution can be produced from it by the methods commonly known in the Arts. It is preferred that the alkali metal silicate glass powder contain more than 25 mole percent of alkali metal oxide. A mixture of alkali metal silicates having a low alkali metal oxide content and another having a height alkali metal oxide content may be used to produce polymeric alkali metal silicate glass.

The alkali metal silicate glass is a mixture of alkali metal polysilicates with the molecules of alkali metal polysilicates containing various amounts of alkali metal oxide radicals, thereby making a portion of the alkali metal silicate glass readily soluble in water. The remaining portion is slow to dissolve enough to form a suspension. Part of the suspended particles will gradually settle out of the water.

The alkali metal silicate glass having a lower ratio of $SiO_2$:alkali metal oxide such as 2:1 will form a suspension more readily than those with higher ratios such as 3.2:1 at ambient temperature and pressure. Only a small portion of the alkali metal silicate glass with high ratios of $SiO_2$ is soluble in water and it takes several days at ambient temperature to form an aqueous polymeric alkali metal silicate solution containing a suspension. The mixture at first is white in color, then gradually clears, but remains somewhat opaque.

The physical properties of the aqueous polymeric alkali metal silicate glass solution containing a suspension are greatly different from the physical properties of the alkali metal silicate solutions are now known in the Arts. When an aqueous polymeric sodium silicate glass solution containing a suspension, as produced by the process of this invention, is compared to an aqueous sodium silicate solution with the same $SiO_2:Na_2O$ ratio and concentration such as an $SiO_2:Na_2O$ ratio of 3.25, there is a great difference in the type of organic and inorganic compounds that can be mixed with these products without causing coagulation or gel formation. Many compounds such as alcohols, polyols, substituted organic compounds, polyesters, urea, formaldehyde, amines, organic oxides, epoxies, etc., will cause the known aqueous sodium silicate solution to precipitate, coagulate or gel when mixed together, whereas the novel aqueous polymeric sodium silicate glass solution containing a suspension is not affected by mixing with these compounds. There is also a much slower reaction to weak acids, such as $CO_2$ in water, on the polymeric glass solution containing a suspension. Atmospheric $CO_2$ is very slow to affect the superficial layer of the polymeric glass solution containing a suspension and after drying, the film has remained flexible for months, whereas aqueous sodium silicate solutions are rapidly affected by $CO_2$ and deteriorate.

A comparison study was done, utilizing a commerical available aqueous sodium silicate solution with an $SiO_2:Na_2O$ ratio of 3.25:1 and containing about 37% solids and an aqueous polymeric sodium silicate glass solution containing a suspension produced by the process of this invention with the same $SiO_2:Na_2O$ ratio and concentration. An equal amount of each was poured on polyethylene sheet to produce a uniform thin film. These films were dried under the same ambient temperature and pressure at the same time. The dried commerical sodium silicate film products produced were weak, brittle and cracked, whereas the novel polymeric sodium silicate glass film products produced were tough, somewhat elastic and flexible and have remained flexible for about a year. They continue to remain flexible.

Up to about 30 percent by weight of the known aqueous alkali metal silicate solution may be added to the novel polymeric aqueous alkali metal silicate glass solution containing a suspension to increase the rapidity of drying and curing without causing the dried film to be brittle. When over 30 percent by weight of the aqueous alkali metal silicate solution is added, the dried films start to become brittle.

The addition of a free-radical initiator, such as organic and inorganic peroxides, alkali metal persulfates, ammonium persulfate and mixtures thereof, enhances the reaction of the silanol and/or silicic acid groups with each other in the drying process. Promoters and initiators of the free-radical initiator may also be used.

The polymeric alkali metal silicate glass products may be modified or reacted with by many organic and inorganic compounds, up to 300 percent by weight, based on weight of the aqueous polymeric alkali metal silicate glass solution containing a suspension, may be added to the solution containing a suspension. Fillers, inorganic and/or inorganic, strengthening elements, whether in the form of inooganic and/or organic products such as wires, fibers, webs, foams, woven fabric, skeletons, etc., may be added to the polymeric glass solution containing a suspension in an amount up to 300 percent by weight, based on weight of the aqueous polymeric alkali metal silicate glass solution containing a suspension. When there is a high alkali metal oxide content in the aqueous polymeric glass solution containing a suspension, acid-liberating hardeners and salt-forming compounds may be added to react with the alkali metal oxide groups to form salt. The dried, flexible polymeric alkali metal silicate glass product produced may be placed in an atmosphere of $CO_2$ to assist in the curing of the product.

The polymeric alkali metal silicate glass may be foamed by heating the aqueous polymeric alkali metal silicate glass solution containing a suspension to above the boiling of water and the polymeric alkali metal silicate glass dries and expands into a cellular product. The aqueous polymeric alkali metal silicate glass solution containing a suspension may be first dried, then heated to above the boiling temperature water and the steam, produced expands the polymeric metal silicate glass into a rigid cellular product. Blowing agents, emulsifiers, cell regulators, foam stabilizers, inert fillers, modifying compounds, free-radical initiators and water-binding agents may be added to the aqueous polymeric alkali metal silicate glass solution containing a suspension before foaming.

Additives may be added to emulsify the mixture, to modify the cells in the cellular solid, to regulate the foaming and to stabilize the cellular solid. The mixture may be emulsified with alkali soaps, metallic soaps such as zinc stearate and calcium stearates and detergents. The cells in the cellular solid may be modified, regulated and stabilized by the addition of additives such as metallic powders, ethyl cellulose, chlorinated natural rubber, polyvinyl acetate, polyvinylchlorides, metallic salts, metallic oxides, an hydroxides, alkylated phenoxy compounds, polyethyoxy ethanol, sodium dioctyl sulfosuccinate, methyl morpholine, diethylethanolamine, polyether siloxanes, and mixtures thereof.

The novel solid and cellular products produced by this invention have many uses. The aqueous polymeric alkali metal silicate glass solution containing a suspension may be sprayed by means of compressed air or by the airless spraying process onto surfaces. It forms a protective coating on wood, steel, iron, tin metal sheets, plastics, fabric, etc. It may be applied to these products by means of a brush, roller, or by dipping, to form a protective coating. This protective coating of flexible polymeric alkali metal, silicate glass may be heated to above the boiling point of water and it expands from 3 to 5 times its original volume to form a protective and insulating coating. The aqueous polymeric alkali metal silicate glass solutions containing a suspension may be utilized as an adhesive by applying it between two pieces of paper, glass, fabric, wood, metal, plastics, etc., and then allowing the solution containing a suspension to dry into a strong, flexible adhesive film. Reinforcing elements may be added to strengthen the coating and adhesive film. The aqueous polymeric alkali metal silicate glass solution containing a suspension, optionally containing fillers, modifying compounds, free radical initiators, salt-forming compounds, reinforcing elements, coloring and any other desirable additive, may be poured into a mold, then dried into a solid polymeric alkali metal silicate glass product. The aqueous polymeric alkali metal silicate glass solution containing a suspension may be poured into a mold, optionally containing fillers, blowing agents, foam stabilizers, emulsifiers, coloring agents, salt-forming compounds, reinforcing agents, modifying compounds, free radical initiators and any other desirable additive, then be heated so as to evaporate water until a solid is formed. Then it is heated to above the temperature of boiling water, thereby foaming it to produce a cellular rigid product which may be used as thermal and sound-insulation panels, packaging material, art objects, building material, lightweight blocks, catalyst carriers, door insulation panels, etc.

Any suitable organic or inorganic compound which reacts with the alkali metal oxide radical of the polymeric alkali metal silicate glass to produce a salt may be used in this invention to reduce the alkali metal oxide radical reacted with the silica, thereby making the flexible polymeric glass more water-resistanct. The salt-forming compounds which slowly react with the polymeric alkali metal silicate glass are preferred, e.g., alkaline earth metal salts, metal salts, organic-inorganic metal salts, organic esters, alkylating agents, etc.

Suitable salt-forming compounds may contain salt-forming groups, for example: —COOH, —$SO_2N$, SO—NH—$SO_2$, —CO—N H—CO—, —Cl, —Br, —$NO_3$, —I, —F, —$CO_3$.

Two or more of the aforementioned groups can also be present. Suitable salt-forming compounds include, but are not limited to, mineral acids, hydrogen-containing salts of mineral acids, organic acid, polyfunctional alkylating agents, monofunctional alkylating agents, $CO_2$, halogens, alkaline earth metal inorganic salts, alkaline earth metal organic salts, metal inorganic salts and metal organic salts. Further examples of salt-forming compounds may be found in DAS No. 1,205,087; Dutch Auslegischrift No. 67/03743; German Pat. No. 1,178,586; and in U.S. Pat. No. 3,450,592. Various salt-forming compounds may also be used in combination.

Any suitable free-radical initiator which will promote the chemical reaction of an alkali oxidated silicon compound with another oxidated silicon compound, inorganic compound or organic compound may be used in this invention. Suitable free-radical initiators are inorganic and organic peroxides, alkali metal persulfates and mixtures thereof. The free-radical initiator can be modified by activators and promoters. Initiators are strong oxidizing agents and promoters that usually are strong reducing agents. Redox systems may also be utilized in this invention. The activators and promoters vary with each free radical initiator and are well known in the chemical arts. The organic peroxides are well known in the chemical arts.

The preferred free-radial intiators are inorganic peroxides.

Any suitable organic or inorganic compound that will react chemically with polymeric alkali oxidated silicon compound may be used to modify the polymeric alkali metal silicate glass products. Compounds which are polymerized by free-radical initiators may be used to modify the polymeric alkali metal silicate glass products.

Any suitable modifying or additive compounds may be used in the reaction of this invention to vary properties of the product. Typical modifying compounds include polyols, polyepoxides, polysulfide polymers, alkali sulfides, sodium polysulfides, aminoplasts, phenoplasts, fatty or rosin acids, furfural-ketone resins, styrene oxides, carbon disulfide, sulfur, wood flour, wood fibers, cellulose, lignin, polyester polymers, polyether polymers, vegetable oil, melamine, furan compounds, vinyl monomers and polymers, and copolymers, aliphatic diene polymers and copolymers, halogenated aliphatic and aromatic compounds, triallyl cyanurate, polyepichlorohydrin polymers, alkali metal phenols, alkali metal salts of dicarboxyl acids, alkali metal polyhydroxy aliphatic and aromatic compounds, alkali metal salts of poly(acrylic acid) polymers and poly(methacrlic acid) polymer, aldehydes and organic esters, phosphate polyols and mixtures thereof.

Various reinforcing agents may be used in this invention. The inorganic and/or organic reinforcing elements may be, e.g., fibers, metal wires, foams, fabrics, fleeces or skeletons. The reinforcing elements may be mixed with the reaction mixture, for example, by the fibrous web impregnation or by processes in which the reaction mixtures and reinforcing fibers are together applied to the molds, for example, by means of a spray apparatus. The shaped products obtained in this way may be used as building elements, e.g., in the form of sandwich elements, either as such or after they have been laminated with metal, glass, plastics, wood or concrete. If desired, these sandwich elements may be foamed. These products may be used as hollow bodies, e.g., as containers for goods which may be required to be moist or cool, as filter materials or exchanges, as catalyst carriers or as carriers of active substances, as decorative elements, furniture components and filling for cavities. They may be used in the field of model building and mold building, and in the production of molds for metal casting, which may also be considered.

Fillers in the form of powders, granules, wire, fibers, dumbbell-shaped particles, crystallites, spirals, rods, beads, hollow beads, foam particles, non-woven webs, pieces of woven or knitted fabrics, tapes and pieces of foil or solid inorganic or organic substances, e.g., dolomite, chalk, alumina, asbestos, basic silicic acids, sand, talc, iron oxide, aluminum oxide and hydroxide, calcium sulfates, alumino silicates, basalt wood or powder, glass fibers, carbon fibers, graphite, carbon black, Al, Fe, Cu and Ag powders, molybdenum sulfide, steel wool, bronze or copper meshes, silicon powder, expanded clay particles, hollow glass beads, glass powder, lava and pumice particles, wood chips, wood meal, cork, cotton, straw, popcorn, coke or particles of filled or unfilled, foamed or unfoamed, stretched or unstretched organic polymers, may be added to the mixture of the components in many applications. Among the numerous organic polymers which may be used, e.g., as powders, granules, foam particles, beads, hollow beads, foamable but not-yet-foamed particles, fibers, tapes, woven fabrics or fleeces, the following may be mentioned as examples: polystryene, polyethylene, polypropylene, polyacrylonitrite, polybutadiene, polyisoprene, polytetrafluoroethylene, aliphatic and aromatic polyesters, melamine, phoenoplasts, aminoplasts, polyacetal resins, polyepoxides, polyhydantoins, polyethers, polyurethane, polyimides, polyamides, polysulphones, polycarbonates and carbonates and mixtures thereof.

The composite materials of the invention may be mixed with considerable quantities of fillers without losing their advantageous properties and, in particular, composite materials which consist predominantly of organic constituents which are, preferably, filled with inorganic fillers, where silicate constituents predominate, it is preferably filled with organic fillers.

Blowing agents may be used in this invention. The blowing agents are usually inert liquids with boiling points ranging from $-25°$ C. to $100°$ C. The organic blowing agents may be, e.g., acetone, ethyl acetate, halogenated alkanes, e.g., methylene chloride, monofluorotrichloromethane, dichlorodifluoromethane, butane, hexane, heptane or diethylether. There are compounds which decompose at temperatures above room temperature with liberation of, e.g., nitrogen. Compressed air may also be used as the blowing agent.

The object of the present invention is to provide a novel process to produce a novel polymeric alkali metal silicate glass. Another object is to produce an aqueous polymeric alkali metal silicate glass solution and/or suspension. Another object is to produce polymeric alkali metal silicate glass product by drying out the water from the polymeric glass solution and/or suspension. Anothe object is to produce alkali metal silicate glass foam products. Still another object is to produce novel cullular and solid polymeric alkali metal silicate glass products which are relatively low cost. Another object is to produce novel cellular products which are rigid, light-weight, have good strength, are flame-proof, with good resistance and dimensional stability when heated, and may be used for thermal or sound insulation, structural purposes, shock-resistant packaging such as a cavity filler and casting material. Another object is to produce novel polymeric aqueous alkali metal silicate glass solution and/or suspension which may be utilized as a coating agent, as a binder, as an adhesive, as cast material, as mortar and as flexible films.

The ratio of the essential reactants and optional reactants which lead to producing polymeric alkali metal silicate glass, aqueous polymeric alkali metal silicate glass solution and/or suspension, polymeric alkali metal silicate glass solids and foams produced in this invention may vary, broadly speaking, with ranges as follows:
(a) 10 to 80 parts by weight of alkali metal silicate glass;
(b) 50 to 100 parts by weight of water;

(c) up to 10 percent by weight of a free-radical initiator, based on weight of the aqueous polymeric alkali metal silicate glass solution and/or suspension;

(d) up to 300 percent by weight of a modifying compound, based on weight of the aqueous polymeric alkali metal silicate glass solution and/or suspension;

(e) up to 100 percent by weight of an oxidated silicon compound, based on the weight of the aqueous polymeric alkali metal silicate glass solution and/or suspension;

(f) up to 300 percent by weight of an inert filler material, based on weight of the aqueous polymeric alkali metal silicate glass solution and/or suspension;

(g) up to 20 percent by weight of a foam stabilizer, based on the weight of the aqueous polymeric alkali metal silicate glass solution and/or suspension;

(h) up to 50 percent by weight of a chemically inert blowing agent, boiling within the range of from—25° C. to 100° C., based on the weight of the aqueous polymeric alkali metal silicate glass solution and/or suspension;

(i) up to 10 percent by weight of an emulsifier, based on the weight of the aqueous polymeric alkali metal silicate glass solution and/or suspension;

(j) up to 10 percent by weight of an activator for the free-radical initiator, based on the weight of the aqueous polymeric alkali metal silicate glass solution and/or suspension;

(k) up to 10 percent by weight of a promoter of the free-radical initiator, based on the weight of the aqueous polymeric alkali metal silicate glass solution and/or suspension;

(l) up to 30 percent by weight of a salt-forming compound, based on the weight of the aqueous polymeric alkali metal silicate glass solution and/or suspension.

DESCRIPTION OF PREFERRED EMBODIMENTS

My invention will be illustrated in greater detail by specific Examples, which follow, it being understood that these preferred embodiments are illustrative of, but not limited to, procedure which may be used in the production of polymeric alkali metal silicate glass and it's products. Parts and percentages are by weight unless otherwise indicated.

EXAMPLE 1

About 20 pounds of a fine sodium silicate glass powder which would pass through a 65 mesh-screen and has a $SiO_2:Na_2O$ ratio of 3.25:1 was placed in a large paper drum container which was open to the indoor atmosphere. The air was at ambient temperature and pressure. The ambient temperature varied from 40° F. to 105° and the humidity varied from 5% to 90%. The glass powder slowly lumped and stuck together by the slow absorption of water from the air and when the air was hot and the humidity was low part of the water was evaporated. The absorption of water slowly and gradually hydrate some of the silicon dioxide radical and then the hydrated silicon dioxide radicals were dehydrated and polymerized by the warm and hot air which had a low humidity. This limited hydration and dehydration cycles slowly polymerizes sodium silicates glass over a 12 month period thereby producing polymeric alkali metal silicate glass.

About 100 parts by weight of the polymeric sodium silicate glass was mixed with 100 parts by weight of water then boiled for 20 to 30 minutes while agitating and replacing the evaporated water thereby producing a mixture of an aqueous polymeric sodium silicate glass solution and suspension containing about 50% solids. A mixed aqueous polymeric sodium silicate glass solution and suspension was also made by mixing 60 parts by weight of water and 40 parts by weight of the polymeric sodium silicate glass then occasionally stirring for 5 days.

A flexible film was produced from the aqueous polymeric sodium silicate glass solution containing a suspension by pouring about one sixteenth of an inch of it into a polyethylene flat container. The film was then dried. The film was clear, somewhat flexible, fair tear strength and has remained this way for over 1 year.

The aqueous polymeric sodium silicate glass may be used as an adhesive or for laminating by applying a thin layer to two pieces of wood, cloth, paper, cardboard, glass or metal then putting the pieces together with pressure and let the excess water dry out of the solution containing a suspenstion thereby producing a strong bond between the pieces.

EXAMPLE 2

About 5 pounds of sodium silicate glass powder, which passed through a 65 mesh-screen and had a $SiO_2:Na_2O$ ratio of 3.25:1, was placed in a closed container then the container's air was replaced with air having about a 90% humidity at ambient temperature and the glass powder was agitated. After about 6 hours the air in the container was replaced with warm air which had a humidity of about 10% and was circulated through the powder for 1 hour. This procedure of particle hydration and dehydration was done twice a day for about 2 months thereby producing a polymeric alkali metal silicate glass.

About 50 parts by weight of the above polymeric sodium silicate glass was admixed with 50 parts by weight of water and boiled for 20-30 minutes while agitating and replacing the evaporated water thereby producing an aqueous polymeric sodium silicate glass solution containing suspended particles of polymeric sodium silicate glass.

EXAMPLE 3

About 5 pounds of sodium silicate glass powder, which will pass through a 65 mesh-screen and has a $SiO_2:Na_2O$ ratio of 3.25:1, is placed in a closed container and the air in the container is replaced with a gaseous environment containing about 50% by weight steam at a pressure ranging from 30 to 50 psig. The powder is agitated. After about 5-10 minutes the steam is replaced with hot dry air and the air flows through the powder for 10-20 minutes while the powder is agitated thereby dehydrating part of the hydrated silicon dioxide molecules and removing excess water by evaporation. The hydration and dehydration steps were repeated about 10 times a day for about 3 days thereby producing polymeric sodium silicate glass.

About 40 parts by weight of the above polymeric sodium silicate glass was admixed with 60 parts by weight of water and boiled for 20-30 minutes while agitating thereby producing a mixture of a suspension and a solution. This suspension in a solution was poured into a polyehtylene plate to about 0.5 mm height and then the excess water was evaporated off thereby producing a flexible, strong and somewhat elastic film.

EXAMPLE 4

Example 1 is modified wherein the sodium silicate glass is replaced or partially replaced with an alkali metal silicate glass powder listed below:
(a) potassium silicate glass
(b) lithium silicate glass replaces 50% of the sodium silicate glass
(c) potassium silicate glass replaces 50% of the sodium silicate glass.

EXAMPLE 5

Example 1 is modified wherein a different $SiO_2:Na_2O$ ratio is used and selected from the list below:
(a) 1:1
(b) 2:1
(c) 1.6:1
(d) 50% of 2:1 and 50% of 3.9:1
(e) 50% of 2:1 and 50% of 3.25:1.

EXAMPLE 6

Example 2 is modified wherein the sodium glass is replaced with potassium silicate glass.

EXAMPLE 7

Comparison studies were done by making thin films of about 0.2–0.3 mil of dried aqueous sodium silicate containing about 40 percent solid sodium silicate with a $SiO_2:Na_2O$ ratio of 3.25:1 which was produced commercially by the method known in the Arts. These thin films of aqueous sodium silicate solution were dried along with the film of aqueous polymeric sodium silicate solution and suspension as produced in Example 1 and 2. The dried films of the commerical solution were rigid, very brittle and had multiple small cracks whereas the film produced as in Example 1 and 2 were flexible, somewhat elastic and had good tear resistance.

The commercial sodium silicate solution with a $SiO_2:Na_2O$ ratio of 3.25:1 was applied to sheets of paper and the paper adhered together. When the paper dried it was rigid and brittle whereas when the sheets of paper adhered with the polymeric sodium silicate glass as produced in Example 1 and 2 was flexible, strong and not brittle.

EXAMPLE 8

About 40 parts by weight of the polymeric sodium silicate glass powder produced by Example 2 is placed in 60 parts by weight of water and boiled for 20–30 minutes thereby producing an aqueous polymeric sodium silicate glass combination of a suspension in a solution.

A modifying compound in the amount of 5 parts by weight and selected from the list below is admixed to the above suspension in a solution, then is dried thereby producing a flexible alkali metal silicate glass product:
(a) glycerol
(b) sucrose
(c) BISPHENOLA
(d) phenol-formaldehyde resin with free OH groups
(e) aminoplast
(f) furfural-keton resin
(g) wood fibers
(h) wood flower
(i) lignin
(j) melamine
(k) polyester resin
(l) aqueous polystyrene emulsion
(m) aqueous polyvinylacetate emulsion
(n) polyepoxy resin
(o) polysulfide polymer
(p) polyamide resin
(q) aqueous emulsion of ethylene vinyl acetate copolymer
(r) styrene with catalytic amount of a peroxide
(s) aqueous emulsion of poly(vinyl chloride)polymer
(t) castor oil
(u) sodium salt of poly(acrylic acid)
(v) dimethyl methyl phosphate
(w) aqueous emulsion of polyisoprene
(x) aqueous solution of polyvinyl alcohol
(y) aqueous emulsion of polyurethane
(z) mixtures of the above.

EXAMPLE 9

An inorganic modifying powdered compound, selected from the list below and in the amount of 10 parts by weight, is admixed to 100 parts by weight of the aqueous polymeric sodium silicate glass solution containing a suspension as produced in Example 1. The solution containing a suspension is then dried thereby producing a flexible polymeric sodium silicate glass product.
(a) magnesium hydroxide
(b) aluminum oxide
(c) boron oxide
(d) lead oxide
(e) barium chloride
(f) aluminum
(g) zeolite
(h) tin oxide
(i) basalt
(j) dolomite
(k) copper
(l) zinc oxide
(m) calcium carbonate
(n) calcium borate
(o) zinc borate
(p) iron oxide
(q) titanium oxide
(r) molybdenum sulfide
(s) iron
(t) arsenic oxide
(u) barium chloride
(v) talc
(w) wallastonite
(x) clay
(y) silicon
(z) mixture of the above.

EXAMPLE 10

The aqueous polymeric sodium silicate glass suspension is a solution of Example 1 is modified wherein the $SiO_2:Na_2O$ ratio is changed by adding 10 parts by weight of the following aqueous silicate solution or suspension to 100 parts by weight of the aqueous polymeric sodium silicate glass solution containing a suspension produced in Example 1:
(a) sodium hydroxide stabilized silica sol with a $SiO_2:Na_2O$ ratio of 10:1
(b) sodium polysilicate with a $SiO_2:Na_2O$ ratio of 10:1
(c) sodium polysilicate with a $SiO_2:Na_2O$ ratio of 20:1
(d) polysilicic acid gel
(e) potassium polysilicate with a $SiO_2:K_2O$ ratio of 11:1
(f) colloidal silica
(g) hydrated silica (h) precipitated silica
(i) sodium silicate solution with a $SiO_2:Na_2O$ ratio of 3.9:1
(j) sodium silicate solution with a $SiO_2:Na_2O$ ratio of 2.0:1.

EXAMPLE 11 the polymeric sodium silicate glass product produced in Example 1 was placed in an atmosphere of carbon dioxide and remained flexible.

EXAMPLE 12

About 40 parts by weight of the polymeric sodium silicate glass is admixed with 60 parts by weight of water and is occasionally stirred. After 5 days a polymeric glass solution containing a suspension is produced. A filler and/or a reinforcing agent, selected from the list below, in an amount of 10 parts by weight, is admixed in the solution containing a suspension, then poured into the desired form and is dried thereby producing a reinforced polymeric sodium silicate glass product:
(a) powdered silica
(b) powdered talc
(c) powdered Wallastonite
(d) fiberglass powder
(e) fiberglass cloth
(f) wood fibers
(g) barium sulfate powder
(h) polyethylene fibers
(i) polyamide fibers
(j) carbon fibers
(k) polyester fibers
(l) polyamide fibers
(m) fine steel fiber
(n) acrylic fibers
(o) polypropylene fibers
(p) woven fabric
(q) expanded fine clay
(r) expanded silica micropheres
(s) silicon powder
(t) chalk powder
(u) copper cloth
(v) polyacrylonitrile fibers
(w) cotton fibers
(x) graphite
(y) dolomite powder
(z) mixtures thereof.

EXAMPLE 13

The aqueous polymeric sodium silicate glass solution containing a suspension of Example 1 is modified by adding a compound which will react with the alkali metal oxide radical to raise the $SiO_2:Na_2O$ ratio to 4:1 and which is selected from the list below:
(a) acetic acid
(b) acrylic acid
(c) methacrylic acid
(d) barium sulfate
(e) barium chloride
(f) lead acetate
(g) sodium hydrogen sulfate
(h) boric acid
(i) ammonia sulfate
(j) adipic acid
(k) maleic anhydride
(l) calcium sulfate
(m) calcium chloride
(n) vinyl acetate
(o) zinc sulfate
(p) ammonium chloride
(q) cupric sulfate
(r) aluminum sulfate
(s) stannous chloride
(t) nickel ammonium sulfate
(u) cobalt sulfate
(v) ferrous sulfate
(w) silicon tetrachloride
(x) calcium phosphate
(y) calcium carbonate
(z) mixtures of the above.

EXAMPLE 14

The aqueous polymeric sodium silicate glass solution containing a suspension produced in Example 12 is modified by adding 0.5 parts by weight of a free-radical initiator selected from the group consisting of organic peroxides, inorganic peroxides and alkali metal persulfates with their initiator, and then adding 10 parts by weight of a polymerizable organic compound, selected from the group below, while agitating and optionally under pressure. When the organic compound is polymerized the mixture is dried to produce a modified flexible solid polymeric alkali metal silicate glass product:
(a) styrene
(b) vinyl acetate
(c) methyl methyl acrylate
(d) methyl acrylate
(e) vinyl chloride
(f) butadiene
(g) acrylonitrile
(h) polyester resin
(i) chloroprene
(j) isoprene
(k) vinylidene chloride
(l) vinyl methyl ether
(m) vinyl pyrrolidone
(n) allyl phthalate
(o) ethyl acetate
(p) allyl methylate
(q) N-vinyl carbazole
(r) mixtures of the above.

EXAMPLE 15

The aqueous polymeric sodium silicate glass solution containing a suspension produced in Example 1 is modified by admixing 0.5 parts by weight of a radical initiator and letting the reaction go to completion then dry the solution containing a suspension thereby producing a flexible alkali metal silicate glass product;
(a) hydrogen peroxide
(b) potassium persulfate
(c) benzoyl peroxide with diethyl aniline
(d) methyl ethyl ketone peroxide with cobalt naphthenate.

EXAMPLE 16

The aqueous polymeric sodium silicate glass solution containing a suspension is dried into a polymeric sodium silicate glass film and then heated to above the boiling point of water, the film expands 3-6 times its original size and forms a light weight cellular polymeric sodium silicate glass.

Although specific conditions and ingredients have been described in conjunction with the above examples of preferred embodiments, these may be varied and other reagents and additives may be used, where suitable, as described above, with similar results.

Other modifications and applications of this invention will occur to those skilled in the art upon reading this disclosure. These are intended to be included within the scope of this invention as defined in the appended claims.

I claim:

1. A polymeric alkali metal silicate glass produced by contacting alkali metal silicate glass powder, having a silicon dioxide: alkali metal oxide ratio of 1:1 to 3.9:1 by weight, with a gaseous water at a temperature ranging from ambient temperature to above 100° C., at a pressure ranging from ambient pressure to a steam pressure sufficient to hydrate the alkali metal silicate glass powder and for a time sufficient to hydrate no more than 4 silicon dioxide radicals in each alkali metal silicate glass molecule then the hydrated alkali metal silicate is contacted with air containing a low humidity, at sufficient temperature, pressure and time to dehydrate about 50% of the hydrated silicon dioxide radicals by evaporating off water and these processes are repeated until polymerization has taken place.

2. The product of claim 1 wherein the alkali metal silicate is sodium silicate.

3. The polymeric alkali metal silicate having the general formula of:

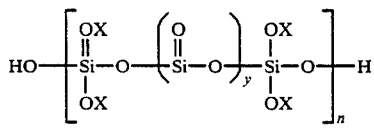

wherein x is an alkali metal atom or a hydrogen atom or a cross-linkage to another polymeric alkali metal silicate glass molecule, y is a number ranging from 1–10, n is a number 2 or greater and the silicon dioxide:alkali metal oxide ranges from 2:1 to 3.9:1.

4. The product of claim 3 wherein the alkali metal silicate is sodium silicate.

5. A polymeric alkali metal silicate glass product produced by admixing 10 to 80 parts by weight of the polymeric alkali metal silicate glass of claim 1 with 50 to 100 parts by weight of water until an aqueous alkali metal silicate glass solution containing a suspension is produced, then pour or apply the aqueous alkali metal silicate glass solution containing a suspension into the desired form then evaporate the water thereby producing a polymeric alkali metal silicate glass product.

6. A polymeric alkali metal silicate glass product produced by the following steps:
(a) contacting alkali metal silicate glass powder, having a silicon dioxide:alkali metal oxide ratio of 1:1 to 3.9:1 by weight, to normal atmospheric air in which the humidity varies from high humidity to a low humidity at ambient temperature and pressure, for a period of 1 to 12 months thereby producing a polymeric alkali metal silicate glass;
(b) admixing 10 to 80 parts by weight of the polymeric alkali metal silicate glass with 50 to 100 parts by weight of water until an aqueous alkali metal glass solution containing a suspension is produced;
(c) pouring or applying the aqueous polymeric alkali metal silicate glass solution containing a suspension into the desired form;
(d) drying out water from the aqueous polymeric alkali metal silicate glass.

7. The product of claim 6 wherein the alkali metal silicate is sodium silicate.

8. A polymeric alkali metal silicate glass produced by the following steps:
(a) contacting alkali metal silicate glass powder, having a silicon dioxide:alkali metal oxide ratio of 1:1 to 3.9:1 by weight with a gaseous water having a relative humidity of at least 5% at a temperature in excess of 100° C. and at a pressure in excess of 20 psig for a period of time sufficient to hydrate no more than 4 silicon oxide radicals on the alkali metal silicate molecule;
(b) contacting the partially hydrated alkali metal silicate glass powder with moving dry air of low relative humidity until at least 50% of the water is evaporated from the glass powder;
(c) repeat steps a and b until polymerization has taken place.

9. The product of claim 8 wherein the alkali metal silicate is sodium silicate.

10. The aqueous polymeric alkali metal silicate glass solution containing a suspension produced by admixing 10 to 80 parts by weight of the polymeric alkali metal silicate glass of claim 1 with 50 to 100 parts by weight of water at a temperature ranging from ambient temperature to the boiling temperature of the water for sufficient time to produce the solution containing a suspension.

11. The product of claim 10 wherein the alkali metal silicate is sodium silicate.

12. The product of claim 5 wherein up to 100 percent by weight of an oxidated silicon compound, percentage based on the weight of the aqueous polymeric alkali metal silicate glass solution containing a suspension, is added to the aqueous polymeric alkali metal silicate glass solution containing a suspension.

13. The product of claim 5 wherein up to 30% by weight of sodium silicate solution, based on the weight of the polymeric aqueous alkali metal silicate glass solution containing a suspension, having a silicon dioxide:alkali metal oxide ratio of 2.0:1 to 3.75:1 and containing 10 to 50 percent by weight of sodium silicate, is added to the aqueous polymeric alkali metal silicate solution containing a suspension, then drying water from the mixture, thereby producing a solid polymeric alkali metal silicate glass product.

14. The product of claim 13 wherein the alkali metal silicate is sodium silicate.

15. The product of claim 5 wherein up to 300 percent by weight of inert filler material, based on the weight of the aqueous polymeric alkali metal silicate glass solution containing a suspension, is added to the aqueous polymeric alkali metal silicate glass solution containing a suspension.

16. The product of claim 5 wherein up to 300 percent by weight of a modifying compound, based on the weight of the aqueous polymeric alkali metal silicate glass solution containing a suspension, is added to the aqueous polymeric alkali metal silicate glass solution containing a suspension.

17. The product of claim 5 wherein the solid polymeric alkali metal silicate glass product is placed in an atmosphere of carbon dioxide.

* * * * *